United States Patent
Birt et al.

(10) Patent No.: US 8,136,163 B2
(45) Date of Patent: Mar. 13, 2012

(54) METHOD, APPARATUS AND PROGRAM STORAGE DEVICE FOR PROVIDING AUTOMATED TRACKING OF SECURITY VULNERABILITIES

(75) Inventors: Kristy L. Birt, Greeley, CO (US); James P. Goddard, Erie, CO (US); Kerry L. Lauren, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 2058 days.

(21) Appl. No.: 10/759,241

(22) Filed: Jan. 16, 2004

(65) Prior Publication Data
US 2005/0160480 A1   Jul. 21, 2005

(51) Int. Cl.
*G06F 21/00* (2006.01)
(52) U.S. Cl. .......................................................... 726/25
(58) Field of Classification Search ............... 726/22–25; 713/187–188
See application file for complete search history.

(56) References Cited

U.S. PATENT DOCUMENTS

| | | | |
|---|---|---|---|
| 5,944,825 A * | 8/1999 | Bellemore et al. | 726/18 |
| 5,971,272 A | 10/1999 | Hsiao | |
| 6,185,689 B1 * | 2/2001 | Todd et al. | 726/25 |
| 6,205,552 B1 * | 3/2001 | Fudge | 726/25 |
| 6,324,656 B1 * | 11/2001 | Gleichauf et al. | 714/37 |
| 6,782,421 B1 * | 8/2004 | Soles et al. | 709/223 |
| 7,243,148 B2 * | 7/2007 | Keir et al. | 709/224 |
| 2002/0147803 A1 | 10/2002 | Dodd et al. | |
| 2003/0046128 A1 | 3/2003 | Heinrich | |
| 2004/0006704 A1 * | 1/2004 | Dahlstrom et al. | 713/200 |

FOREIGN PATENT DOCUMENTS

| | | |
|---|---|---|
| FR | 2819322 A1 | 7/2002 |
| WO | WO 00/70456 | 11/2000 |
| WO | WO 01/84270 A2 | 11/2001 |

OTHER PUBLICATIONS

Neumann, Peter G., "Risks to the Public in Computers and Related Systems," *ACM SIGSOFT Software Engineering Notes*, vol. 25, No. 4, pp. 7-11, Jul. 2000.
Viega, John, Bloch, J.T., Kohno, Tadayoshi, and McGraw, Gary, "Token-Based Scanning of Source Code for Security Problems," *ACM Transactions on Information and System Security*, vol. 5, No. 3, pp. 238-261, Aug. 2002.

* cited by examiner

*Primary Examiner* — Benjamin Lanier
*Assistant Examiner* — Devin Almeida
(74) *Attorney, Agent, or Firm* — Christopher & Weisberg, P.A.

(57) ABSTRACT

A method, apparatus and program storage device for providing automated tracking of security vulnerabilities is disclosed. Security problems are reported, aged and tracked. A time to fix the vulnerability identified by the vulnerability assessment of the system is based on the determined vulnerability score. The vulnerability factor is based upon consideration of a plurality of identified parameters.

21 Claims, 5 Drawing Sheets

METHOD, APPARATUS AND PROGRAM STORAGE DEVICE FOR PROVIDING AUTOMATED TRACKING OF SECURITY VULNERABILITIES

BACKGROUND OF THE INVENTION

1. Field of the Invention

This invention relates in general to network security, and more particularly to a method, apparatus and program storage device for providing automated tracking of security vulnerabilities.

2. Description of Related Art

Security is a primary concern for companies of all sizes. This is especially true for information security. Any business involved in e-commerce, database management, e-mail communication and anything else requiring the Internet or networks needs to be concerned with protecting critical information. Hundreds of new vulnerabilities are being discovered annually, and dozens of new security patches are being released monthly. Compounding matters, when opening the company network perimeter for consumers and business partners, system-level security becomes even more critical as it forces an increase in exposure points. Every hole must be patched because an attacker needs to find only one hole to compromise the entire environment. A firewall alone is not sufficient for network security.

Information security has evolved over the years due to the increasing reliance on public networks to disclose personal, financial, and other restricted information. The popularity of the Internet was one of the most important developments that prompted an intensified effort in data security. An ever-growing number of people are using their personal computers to gain access to the resources that the Internet has to offer, such as research and information retrieval to electronic mail and commerce transaction. However, the Internet and its earlier protocols were developed as a trust-based system. That is, the Internet Protocol was not designed to be secure in itself. There are no approved security standards built into the TCP/IP communications stack, leaving it open to potentially malicious users and processes across the network. Modern developments have made Internet communication more secure, but there are still several incidents that gain national attention and alert us to the fact that nothing is completely safe.

Enterprises in every industry rely on regulations and rules that are set by standards making bodies such as the American Medical Association (AMA) or the Institute of Electrical and Electronics Engineers (IEEE). The same ideals hold true for information security. Many security consultants and vendors agree upon the standard security model known as CIA, or Confidentiality, Integrity, and Availability. This three-tiered model is a generally accepted component to assessing risks to sensitive information and establishing security policy.

Confidentiality refers to the fact that sensitive information must be available only to a set of pre-defined individuals. Unauthorized transmission and usage of information should be restricted. For example, confidentiality of information ensures that an unauthorized individual does not obtain a customer's personal or financial information for malicious purposes such as identity theft or credit fraud.

Integrity means that information should not be altered in ways that render it incomplete or incorrect. Unauthorized users should be restricted from the ability to modify or destroy sensitive information.

Availability refers to the concept that information should be accessible to authorized users any time that it is needed. Availability is a warranty that information can be obtained with an agreed-upon frequency and timeliness. This is often measured in terms of percentages and agreed to formally in Service Level Agreements (SLAs) used by network service providers and their enterprise clients.

The widely accepted paradigm of the CIA triad discussed above is a basic framework for a secure environment. There are tools that individually provide network security according to the CIA triad; however these tools are generally specific to only one discipline. Most organizations today conduct some form of security technical testing for their IT infrastructures. There are tools to assist in performing vulnerability reviews, such as a vulnerability scanner against their critical devices to determine if they have vulnerabilities that could lead to a loss of confidentiality, integrity of availability of information. Examples of such tools for providing vulnerability review include Nessus, security products from Internet Security Systems (ISS), Network Security Assessment (NSA), Retina® just to name a few. Another tool for performing security audits is Nmap ("Network Mapper"). Nmap is a free open source utility that was designed to determine what hosts are available on the network, what services (application name and version) they are offering, what operating system (and OS version) they are running, and dozens of other characteristics.

These programs will generally create text or HTML files that list each vulnerability found. Although most organizations have little to no trouble in running such applications against their environments and hence uncovering security issues, these same organizations often struggle with tracking these problems to closure. In other words, they find it easy to uncover the problems, but find it more difficult to track and fix the problems.

Problem tracking tools provided by companies, such as Remedy Corporation and Peregrine Systems, have attempted to solve this issue. Remedy Corporation provides Remedy IT Service Management applications and Remedy's Action Request System®. These applications provide escalation, alerting, and reporting features for ensuring that critical issues do not fall through the cracks by providing a detailed audit trail that allows review and refinement of workflow responses. Peregrine Systems provides ServiceCenter® for tracking and prioritizing incidents as well as trend analysis. However, these tools are limited in a number of ways. For one, they do not allow for automated validation that a problem ticket has actually been fixed. It is left to human judgment and integrity if an issue is fixed. However, in the security field this is unacceptable. Second, these tools do not necessarily provide for the ability to set timelines for fixing an issue based on multiple factors such as the criticality of the system, the frequency of this vulnerability across the organization, and the severity rating of the vulnerability itself.

It can be seen then that there is a need for a method, apparatus and program storage device for providing automated tracking of security vulnerabilities.

SUMMARY OF THE INVENTION

To overcome the limitations in the prior art described above, and to overcome other limitations that will become apparent upon reading and understanding the present specification, the present invention discloses a method, apparatus and program storage device for reporting, aging and tracking security problems.

The present invention performs a vulnerability assessment to identify a vulnerability score and sets a time to fix the vulnerability based on the determined vulnerability score. The vulnerability factor is based upon consideration of a plurality of parameters.

A method in accordance with the principles of the present invention includes performing a vulnerability assessment on a system, storing data obtained from the vulnerability assessment in a vulnerability database, determining a vulnerability score based on a plurality of vulnerability factors identified by the vulnerability assessment and determining a time to fix a vulnerability identified by the vulnerability assessment of the system based on the determined vulnerability score.

In another embodiment of the present invention, a method for determining a criticality factor for a vulnerability in a computer system is provided. The method includes entering in a database vulnerabilities identified during a vulnerability assessment, monitoring a frequency of occurrence for the identified vulnerabilities and assigning a criticality factor to a vulnerability based upon the frequency of occurrence of the vulnerability in the system.

In another embodiment of the present invention, an apparatus for providing automated tracking of security vulnerabilities is provided. The apparatus includes a memory for storing program instructions and a processor, configured according to the program instructions for performing a vulnerability assessment on a system, storing data obtained from the vulnerability assessment in a vulnerability database, determining a vulnerability score based on a plurality of vulnerability factors identified by the vulnerability assessment and determining a time to fix a vulnerability identified by the vulnerability assessment of the system based on the determined vulnerability score.

In another embodiment of the present invention, an apparatus for determining a criticality factor for a vulnerability in a computer system is provided. The apparatus includes a memory for storing program instructions and a processor, configured according to the program instructions for entering in a database vulnerabilities identified during a vulnerability assessment, monitoring a frequency of occurrence for the identified vulnerabilities and assigning a criticality factor to a vulnerability based upon the frequency of occurrence of the vulnerability in the system.

In another embodiment of the present invention, another apparatus for providing automated tracking of security vulnerabilities is provided. This apparatus includes means for storing program instructions and means configured according to the program instructions provided by the means for storing for performing a vulnerability assessment on a system, storing data obtained from the vulnerability assessment in a vulnerability database, determining a vulnerability score based on a plurality of vulnerability factors identified by the vulnerability assessment and determining a time to fix a vulnerability identified by the vulnerability assessment of the system based on the determined vulnerability score.

In another embodiment of the present invention, another apparatus for determining a criticality factor for a vulnerability in a computer system is provided. This apparatus includes means for storing program instructions and means configured according to the program instructions provided by the means for storing for entering in a database vulnerabilities identified during a vulnerability assessment, monitoring a frequency of occurrence for the identified vulnerabilities and assigning a criticality factor to a vulnerability based upon the frequency of occurrence of the vulnerability in the system.

In another embodiment of the present invention, a program storage device readable by a computer is provided. The program storage device tangibly embodies one or more programs of instructions executable by the computer to perform a method for providing automated tracking of security vulnerabilities, the method including performing a vulnerability assessment on a system, storing data obtained from the vulnerability assessment in a vulnerability database, determining a vulnerability score based on a plurality of vulnerability factors identified by the vulnerability assessment and determining a time to fix a vulnerability identified by the vulnerability assessment of the system based on the determined vulnerability score.

In another embodiment of the present invention, a program storage device readable by a computer is provided. The program storage device tangibly embodies one or more programs of instructions executable by the computer to perform a method for determining a criticality factor for a vulnerability in a computer system, the method including entering in a database vulnerabilities identified during a vulnerability assessment, monitoring a frequency of occurrence for the identified vulnerabilities and assigning a criticality factor to a vulnerability based upon the frequency of occurrence of the vulnerability in the system.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing automated tracking of security vulnerabilities. A common methodology is provided for reporting, aging and tracking security problems. This methodology allows vulnerabilities to be input into record from a vulnerability test and will then start an aging process wherein the vulnerability becomes delinquent after a certain specified timeframe. A critical component is setting the appropriate time to fix a vulnerability. Instead of relying on the simplistic approach of the vulnerability's severity rating, other factors may be incorporated, such as the criticality of the asset and the frequency by which the vulnerability has appeared in the environment. The issue of closing a vulnerability by automatically testing a system when the problem is reported as fixed is also addressed.

Figure 1:
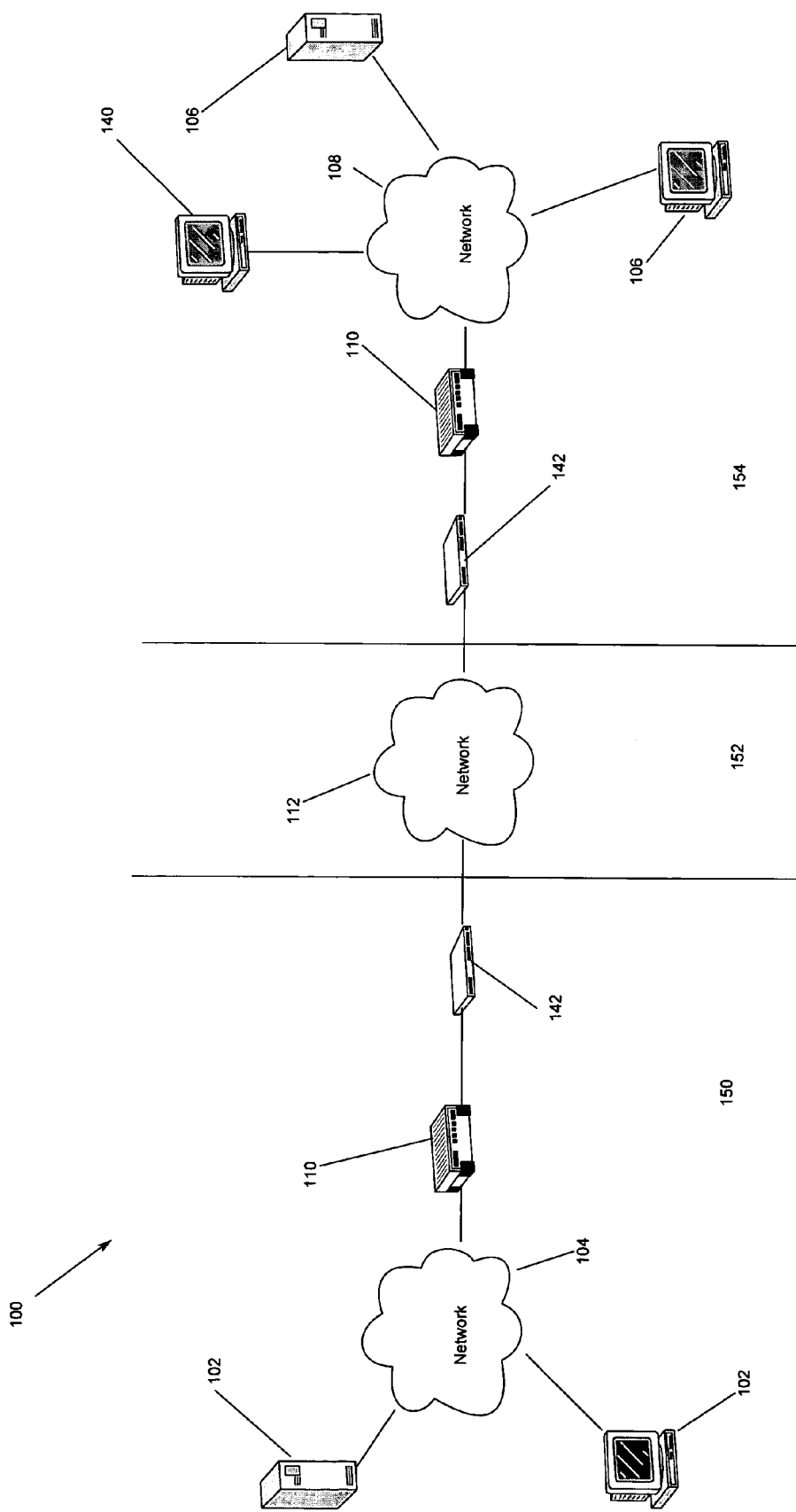
FIG. 1 illustrates a network architecture according to an embodiment of the present invention.

FIG. 1 illustrates a network architecture 100 according to an embodiment of the present invention. As shown, a remote source 102 is provided which is coupled to a network 104. Also included is a plurality of devices 106 coupled to another network 108. In the context of the present network architecture 100, the first network 104 and the second network 108 may each take any form including, but not limited to a local area network (LAN), a virtual local area network (VLAN), a wide area network (WAN) such as the Internet, etc. The devices 106 may include desktop computers, laptop computers, hand-held computers, web servers, business transaction servers, printers or any other type of hardware/software. In use, the remote source 102 accesses the devices 106 via a firewall 110 coupled between the Internet 104 and the VLAN 108.

The firewall 110 is adapted for isolating the VLAN 108 and the devices 106 from access through the Internet 104 attached thereto. The purpose of the firewall 110 is to allow the VLAN 108 and the devices 106 to be attached to, and thereby access, the Internet 104 without rendering them susceptible to hostile access from the Internet 104. If successful, the firewall 110 allows for the VLAN 108 and the devices 106 to communicate and transact with the Internet 104 without rendering them susceptible to attack or unauthorized inquiry over the Internet 104.

The firewall 110 also may use an application gateway, or proxy system. Such systems operate on the basis of an application, or a computing platform's operating system (OS), monitoring "ports" receiving incoming connection requests. A port is a numerically designated element contained in the overhead of a packet. A port number indicates the nature of a service associated with a packet. When the OS or monitoring application receives a request on a particular port, a connection is opened on that port. A program for managing the connection is then initiated, and the firewall 110 starts a gateway application, or proxy, that validates the connection request.

Firewalls 110 typically restrict access based only on address/port/protocol information. Further, proxying firewalls 110 validate communications merely to ensure that requests conform to known standards (e.g. HTTP/1.x). Unfortunately, firewalls 110 do not typically examine content of communications for security purposes.

An administrator terminal 140 provides automated tracking of security vulnerabilities according to an embodiment of the present invention. The administrator terminal 140 may be coupled to a gateway 142 via network 108 and firewall 110. The gateway 142 enables data to flow between different networks 150, 154, including across an intermediate network 152, such as the Internet 112.

Figure 2:
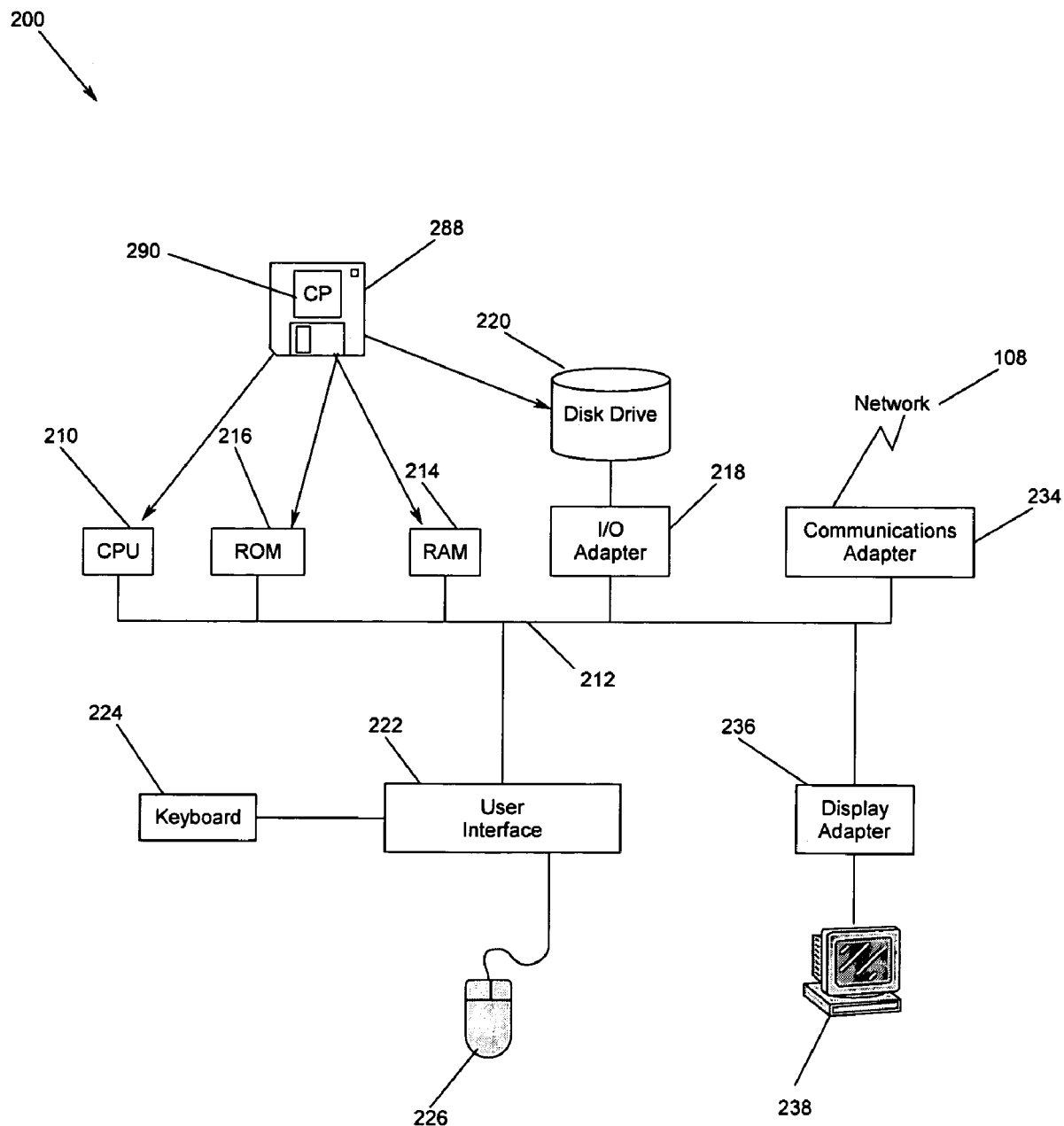
FIG. 2 shows a representative hardware environment in accordance with one embodiment of the present invention.

FIG. 2 illustrates in more detail a particular system 200 in accordance with one embodiment of the present invention. For example, system 200 may represent remote source 102, device 106 and/or administrator terminal 140 of FIG. 1. In FIG. 2, a central processing unit 210, such as a microprocessor, is coupled to a system bus 212. A Random Access Memory (RAM) 214, Read Only Memory (ROM) 216, an I/O adapter 218 is provided for accessing peripheral devices such as disk storage units 220. A user interface adapter 222 is provided for receiving input from user interfaces such as a keyboard 224, a mouse 226, etc. Communication adapter 234 allows the system 200 to be coupled to network 108. In such an example, communication adapter 234 acts as a router for providing network communication with network 108 of FIG. 1. A display adapter 236 is provided for coupling a display device 238 to the bus 212.

The system 200 may have resident thereon an operating system such as the Microsoft Windows® XP, Windows® 2000, Windows® NT or Windows® 9x Operating Systems (OS), the IBM OS/2® operating system, the MAC OS®, UNIX® operating system or Linux® operating system. It will be appreciated that a preferred embodiment may also be implemented on platforms and operating systems other than those mentioned. Embodiments may be written using JAVA™, C, and/or C++ language, or other programming languages, along with an object oriented programming methodology. Object oriented programming (OOP) has become increasingly used to develop complex applications.

In an embodiment of the present invention, automated tracking of security vulnerabilities is provided, and these vulnerabilities are closed without relying on a system owner. By doing so, an embodiment of the present invention will provide for separation of duties. Also, instead of relying on a simplistic approach to prioritizing patch updates by only the severity of the vulnerability, an embodiment of the present invention incorporates other important information, such as the criticality of the asset and the frequency of the vulnerability in the subject environment. By including these factors, IT managers can more effectively allocate resources to security issues. Accordingly, an embodiment of the present invention provides validation that issues are closed, reduces manual intervention to the minimal level and provides more flexibility in allocating limited resources.

Figure 3:
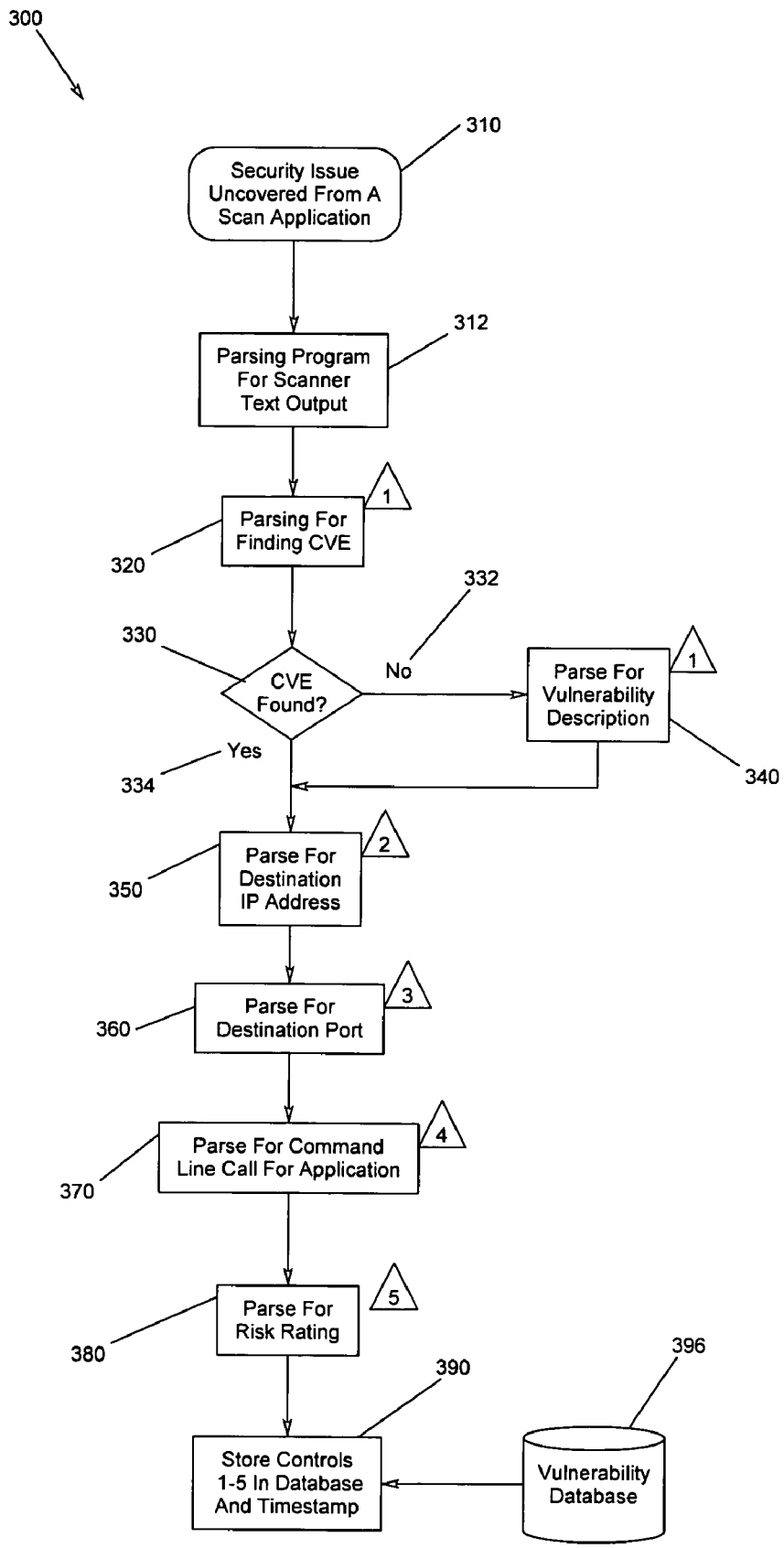
FIG. 3 is a flow chart showing the first stage of the method for providing automated tracking of security vulnerabilities according to an embodiment of the present invention.

FIG. 3 is a flow chart 300 showing the first stage of the method for providing automated tracking of security vulnerabilities according to an embodiment of the present invention. First, an industry vulnerability assessment tool, such as Nessus or ISS Internet Scanner, discovers a vulnerability on a host system 310. The finding will be run through a parsing routine 312 that will dissect the data for five security parameters: the CVE (Common Vulnerabilities and Exposures) number or vulnerability description; the destination IP address, i.e., IP address for targeted system where vulnerability is; the destination port, i.e., TCP or UDP port where vulnerability is; the command-line call for the testing tool and the risk rating of the vulnerability. The finding is parsed to determine a CVE number 320. A determination is made whether the CVE was found 330. If not 332, the finding is parsed for the vulnerability description 340.

If the CVE number is found 334, or after the finding is parsed for the vulnerability description 340, the finding is parsed to find the destination IP address 350 (i.e., the IP address for targeted system where the vulnerability is located). Then, the finding is parsed for the Destination port 360 (e.g., TCP or UDP port where vulnerability is). The finding is parsed to find the command-line call for the application 370. The exact command for calling this application against the destination device will later be used for validating a fix. The finding is parsed for the risk rating of the vulnerability 380. Normally testing tools report a HIGH, MEDIUM or LOW. Once these areas of information are parsed, the data is stored 390 in a vulnerability database 396. See below for more on this process step.

Figure 4:
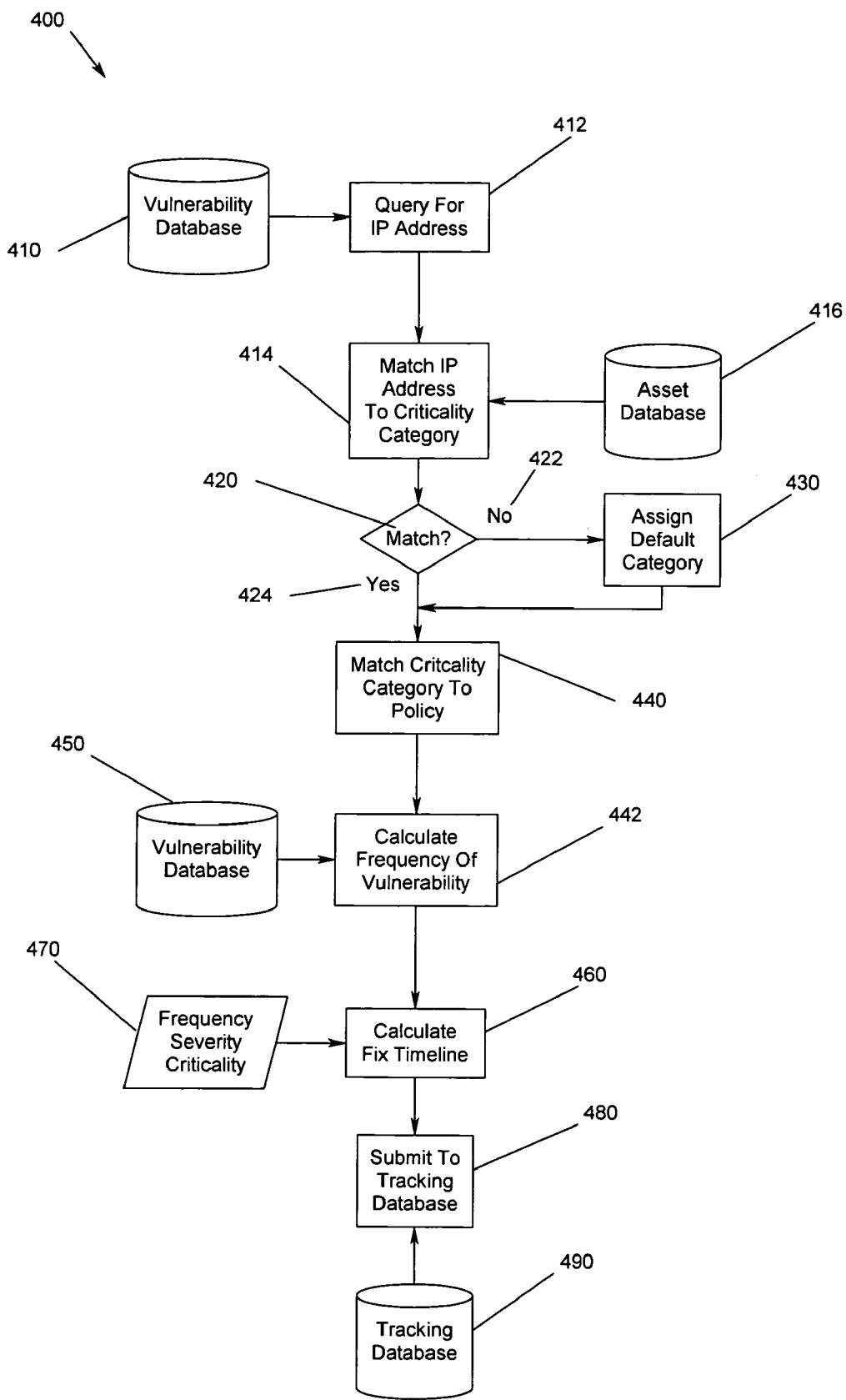
FIG. 4 illustrates a flow chart showing the second stage of the method for providing automated tracking of security vulnerabilities according to an embodiment of the present invention.

FIG. 4 illustrates a flow chart 400 showing the second stage of the method for providing automated tracking of security vulnerabilities according to an embodiment of the present invention. In FIG. 4, a timeline is assigned to fix the discovered vulnerability. The IP address for a vulnerable machine will be queried from 412 the vulnerability database 410. The IP address will be matched for a criticality factor 414 set in the organization's asset database 416. The criticality factor is a measure of the damage that a particular exploit can cause, i.e., how critical is the asset. A determination is made whether a match is found 420. If no match is found 422, the asset is assumed to be a "rogue" and will be assigned a default level of criticality 430. For example, organizations may classify information as Confidential, For Internal Use Only, and Unclassified. Assets that house this data may have similar categories such as HIGH, MEDIUM and LOW value. When an asset is discovered not to be in the main asset database, organizations could label it as LOW value respectively.

When there is a match 424, or after assigning a default level of criticality 430, the criticality level of this asset is matched to the IT security policy to determine if there are any mandatory guidelines for assets in this category 440. Next, a search is performed through the vulnerability database 450 to calculate the frequency that this vulnerability occurs in the environment 442 based on the time of each occurrence. The severity of the vulnerability itself is cross-matched to set a time to fix this vulnerability. A plurality of vulnerability factors, e.g., criticality of the asset, severity of the vulnerability, and frequency of the vulnerability in the environment, are weighted 470 to arrive at a score for determining a time to fix the security issue 460.

For example, the time set to fix the security issue may be determined by assigning a weight to each of a plurality of vulnerability factors, e.g., the criticality of the asset, severity of the vulnerability, and frequency of the vulnerability in the environment. Then a vulnerability score that is based on the sum of the weights for the criticality of the asset, severity of the vulnerability, and frequency of the vulnerability in the environment may be calculated. This score may be compared to predetermined references to arrive at a time to fix the vulnerability. Thus, the higher the score the shorter the time for fixing the vulnerability. Such methods may also include, but are not limited to, setting a time when the severity of the vulnerability falls within a range deemed to be too high to allow further delay. However, the present invention is not meant to be limited to the above example of calculating the time for fixing the vulnerability. Further methods for calculating the time for fixing the vulnerability are possible within the scope of the present invention.

For example, a vulnerability score may be calculated as follows. If the total number of systems (based on inventory) is 300 and the number of hosts experiencing a specific vulnerability is 10, the frequency of the vulnerability is calculated to be 10/300 or 3.3%. Based on this percentage a frequency score of 1 may be assigned. Had the frequency been between 20-29%, the score would be 2, between 30-39%, the score 3, etc. The severity score considers whether the host will allow root compromise and whether the vulnerability is remotely exploitable. A severity score of 4 may be assigned if the vulnerability will allow root compromise to the host and a severity score of 8 if the vulnerability is remotely exploitable. In the present example, the vulnerability is remotely exploitable so the severity score is 8. Criticality considers whether confidential or personal data is on the system and whether information on this asset may be used for aggregation. A score is assigned for each of these situations. In the present example, no confidential or personal data is on the system, but the information on this asset may be used for aggregation so the criticality score is 2. The trust score considers whether the system of isolated or not. In the present example, the system is isolated and the trust score is 0.5.

The final score is calculated as:
Final Score=Frequency Score*Severity Score*Criticality Score*Trust Score
Final Score=1*8*2*0.5=8

The final score is then compared to a database to determine a time to fix the vulnerability. A table for setting the time for fixing the vulnerability is shown below:

| FINAL SCORE | TIME TO SET FOR FIXING VULNERABLITY |
|---|---|
| <10 | 360 days |
| 10-50 | 180 days |
| 50-100 | 30 days |
| 100-300 | 7 days |
| >300 | 3 days |

Thus, based on the final score of 8, the time for fixing the vulnerability is set to 360 days.

Once the time for fixing the vulnerability is determined, the time for fixing the vulnerability along with the IP address and vulnerability description are entered 480 into the tracking database 490. Thus, the second stage of the method for providing automated tracking of security vulnerabilities determines vulnerability score and a time to fix the vulnerability identified by the vulnerability assessment of the system based on the determined vulnerability score.

Figure 5:
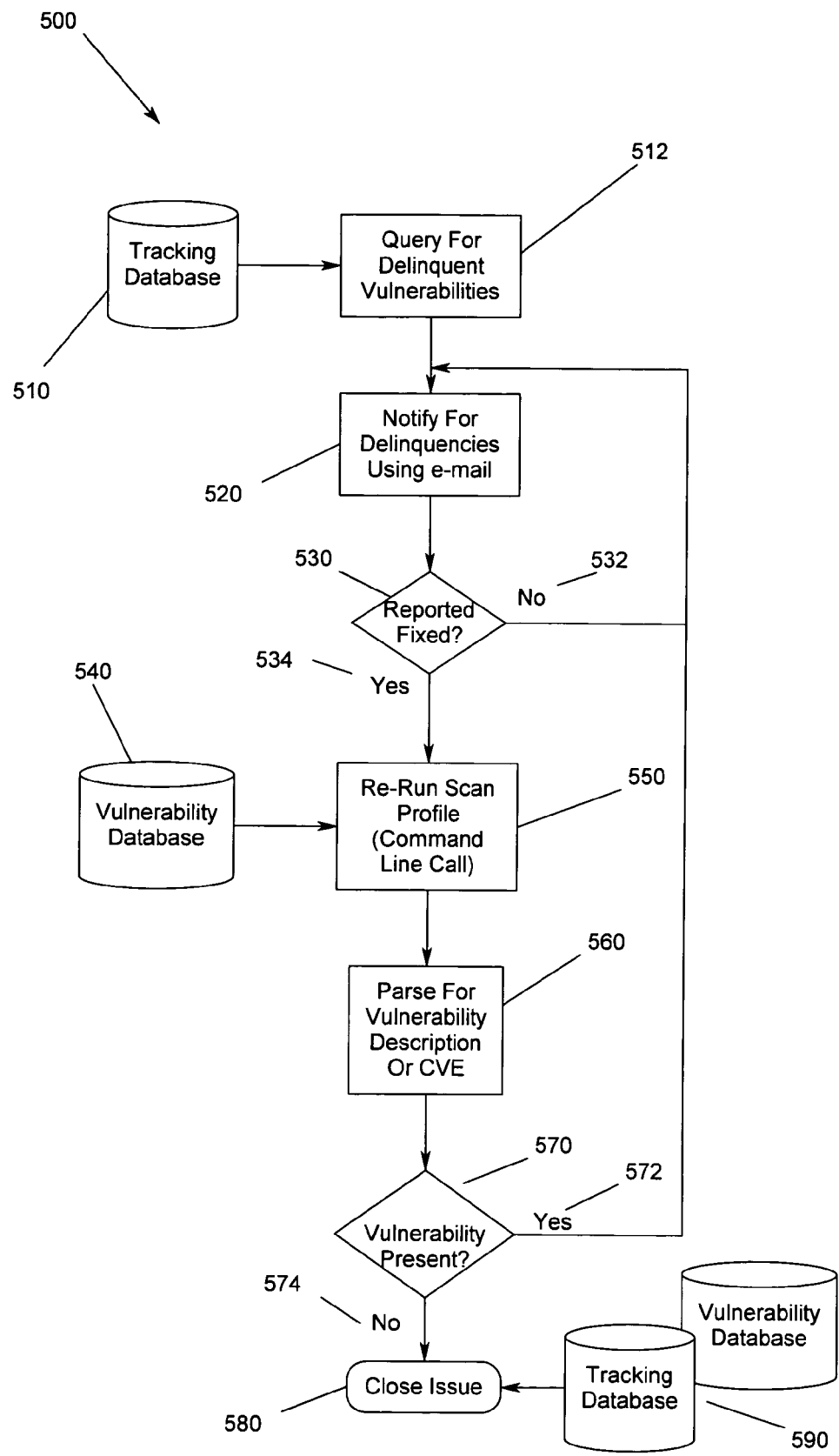
FIG. 5 illustrates a flow chart showing the third stage of the method for providing automated tracking of security vulnerabilities according to an embodiment of the present invention.

FIG. 5 illustrates a flow chart 500 showing the third stage of the method for providing automated tracking of security vulnerabilities according to an embodiment of the present invention. In FIG. 5, the vulnerabilities are tracked and closed. Based on the time set for fixing the vulnerability obtained from the tracking database 510, a query for delinquent vulnerabilities is made 512. Business managers are notified of this delinquency using, for example, e-mail 520. A determination is made as to whether the issue has been fixed 530. If the issue is not fixed 532, the device is sent back in the process to the notification step 520.

In the event that the issue is fixed 534, the same test profile that is now stored in the vulnerability database 540 is run against this subject device 550. The results are run through a parsing module similar to that in the first stage of FIG. 3 560. A determination is made whether there is a match against the vulnerability 570. If yes 572, the device is sent back in the process to the notification step 520. If there is no match 574, the issue is closed 580 and the records are archived from the vulnerability and tracking databases 590.

The process illustrated with reference to FIGS. 1-5 may be tangibly embodied in a computer-readable medium or carrier, e.g. one or more of the fixed and/or removable data storage devices 288 illustrated in FIG. 2, or other data storage or data communications devices. The computer program 290 may be loaded into memory, e.g., ROM 216, RAM 214, disk drive 220, to configure the processor 210 for execution of the computer program 290. The computer program 290 include instructions which, when read and executed by a processor, such as central processing unit 210 of FIG. 2, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing automated tracking of security vulnerabilities, comprising:
using a computing device to perform a security vulnerability assessment on a system;
detecting the presence of a security vulnerability in the system; and
responsive to detecting the presence of the security vulnerability:
storing data obtained from the security vulnerability assessment in a security vulnerability database;
a computer program determining a security vulnerability score, the security vulnerability score being based on a frequency score, a severity score, a criticality score, and a trust score, the frequency score based on a percentage of hosts experiencing the detected security vulnerability in the system and the criticality score based on whether at least one of confidential data and personal data is on the system; and
the computer program determining a time, based on the security vulnerability score, to fix the security vulnerability detected by the security vulnerability assessment of the system.

2. The method of claim 1 further comprising entering an IP address associated with the security vulnerability and a description of the detected security vulnerability in a tracking database.

3. The method of claim 1 further comprising determining delinquent security vulnerabilities based upon the determined time to fix the security vulnerability detected by the security vulnerability assessment.

4. The method of claim 3 further comprising re-running a scan profile when notification is received that the security vulnerability has been fixed.

5. The method of claim 4 further comprising determining whether the security vulnerability still exists and archiving records associated with the security vulnerability when the security vulnerability does not still exist.

6. The method of claim 1, wherein the severity score is based on whether a host will allow root compromise and whether the security vulnerability is remotely exploitable.

7. The method of claim 1, wherein the trust score is based on whether the system is isolated.

8. A method for determining a criticality factor for a security vulnerability in a computer system, comprising:
entering in a database security vulnerabilities detected in the computer system during a security vulnerability assessment;
measuring a frequency of occurrence for the detected security vulnerabilities;
a computer assigning a security vulnerability factor to a detected security vulnerability based upon the frequency of occurrence of the security vulnerability in the system, a criticality of an element in the system, a severity of the security vulnerability within the system, and isolation of the system; and
a computer determining a time, based on the security vulnerability score, to fix the security vulnerability detected by the security vulnerability assessment of the system.

9. The method of claim 8, wherein the criticality of an element in the system is based on whether at least one of confidential data and personal data is on the system.

10. An apparatus for providing automated tracking of security vulnerabilities, the apparatus comprising:
a computer-readable memory;
a computer-readable tangible storage device for storing program instructions; and
a processor, to execute the program instructions via the computer-readable memory, the program instructions when executed by the processor:
performing a security vulnerability assessment on a system;
detecting the presence of a security vulnerability in the system; and
responsive to detecting the presence of the security vulnerability:
storing data obtained from the security vulnerability assessment in a security vulnerability database;
determining a security vulnerability score based on a frequency score, a severity score, a criticality score, and a trust score;
the frequency score based on a percentage of hosts experiencing the detected security vulnerability in the system; and
the criticality score based on whether at least one of confidential data and personal data is on the system; and
determining a time, based on the determined security vulnerability score, to fix a security vulnerability detected by the security vulnerability assessment of the system.

11. The apparatus of claim 10, wherein the processor enters an IP address associated with the security vulnerability and a description of the detected security vulnerability in a tracking database.

12. The apparatus of claim 10, wherein the processor identifies delinquent security vulnerabilities based upon the determined time to fix the security vulnerability detected by the security vulnerability assessment.

13. The apparatus of claim 12, wherein the processor re-runs a scan profile when notification is received that the security vulnerability has been fixed.

14. The apparatus of claim 13, wherein the processor determines whether the security vulnerability still exists and archives records associated with the security vulnerability when the security vulnerability does not still exist.

15. The apparatus of claim 10, wherein the severity score is based on whether a host will allow root compromise and whether the security vulnerability is remotely exploitable.

16. The apparatus of claim 10, wherein the trust score is based on whether the system is isolated.

17. An apparatus for determining a criticality factor for a security vulnerability in a computer system, the apparatus comprising:
a computer-readable memory;
a computer-readable tangible storage device for storing program instructions; and
a processor, to execute program instructions via the computer-readable memory, the program instructions when executed by the processor:
entering in a database security vulnerabilities detected in the computer system during a security vulnerability assessment, measuring a frequency of occurrence for the detected security vulnerabilities; and
assigning a security vulnerability factor to a security vulnerability based upon the frequency of occurrence of the security vulnerability in the system, a criticality of an element in the system, a severity of the security vulnerability within the system, and isolation of the system, and determining a time, based on the security vulnerability factor, to fix the security vulnerability detected by the security vulnerability assessment of the system.

18. The apparatus of claim 17, wherein the processor considers a criticality of an element in the system the criticality based on whether at least one of confidential data and personal data is on the system.

19. An apparatus for providing automated tracking of security vulnerabilities, comprising:

means for storing program instructions; and means configured according to the program instructions provided by the means for storing for:

performing a security vulnerability assessment on a system;

detecting the presence of a security vulnerability in the system; and responsive to detecting the presence of the security vulnerability:

storing data obtained from the security vulnerability assessment in a security vulnerability database;

determining a security vulnerability score, the security vulnerability score being a product of a frequency score, a severity score, a criticality score, and a trust score;

the frequency score based on a percentage of hosts experiencing the detected security vulnerability in the system; and the criticality score based on whether at least one of confidential data and personal data is on the system; and determining a time, based on the determined security vulnerability score, to fix a security vulnerability detected by the security vulnerability assessment of the system.

20. A program storage device readable by a computer, the program storage device tangibly embodying one or more programs of instructions executable by the computer to perform a method for providing automated tracking of security vulnerabilities, the method comprising:

performing a security vulnerability assessment on a system;

detecting the presence of a security vulnerability in the system; and responsive to detecting the presence of the security vulnerability:

storing data obtained from the security vulnerability assessment in a vulnerability database;

determining a security vulnerability score based on a frequency score, a severity score, a criticality score, and a trust score;

the frequency score based on a percentage of hosts experiencing the detected security vulnerability in the system; and the criticality score based on whether at least one of confidential data and personal data is on the system; and determining a time to fix, based on the determined security vulnerability score, a security vulnerability detected by the security vulnerability assessment of the system.

21. A program storage device readable by a computer, the program storage device tangibly embodying one or more programs of instructions executable by the computer to perform a method for determining a criticality factor for a security vulnerability in a computer system, the method comprising:

entering in a database security vulnerabilities detected in the computer system during a security vulnerability assessment;

measuring a frequency of occurrence for the detected security vulnerabilities; and assigning a security vulnerability factor to a security vulnerability based upon the frequency of occurrence of the security vulnerability in the system, a criticality of an element in the system, a severity of the security vulnerability within the system, and isolation of the system; and determining a time, based on the security vulnerability score, to fix the security vulnerability detected by the security vulnerability assessment of the system.

* * * * *